Oct. 3, 1967     A. PHILLIPSON     3,344,632

PROCESS CONTROL APPARATUS

Filed May 5, 1965     2 Sheets-Sheet 1

Fig. 1.

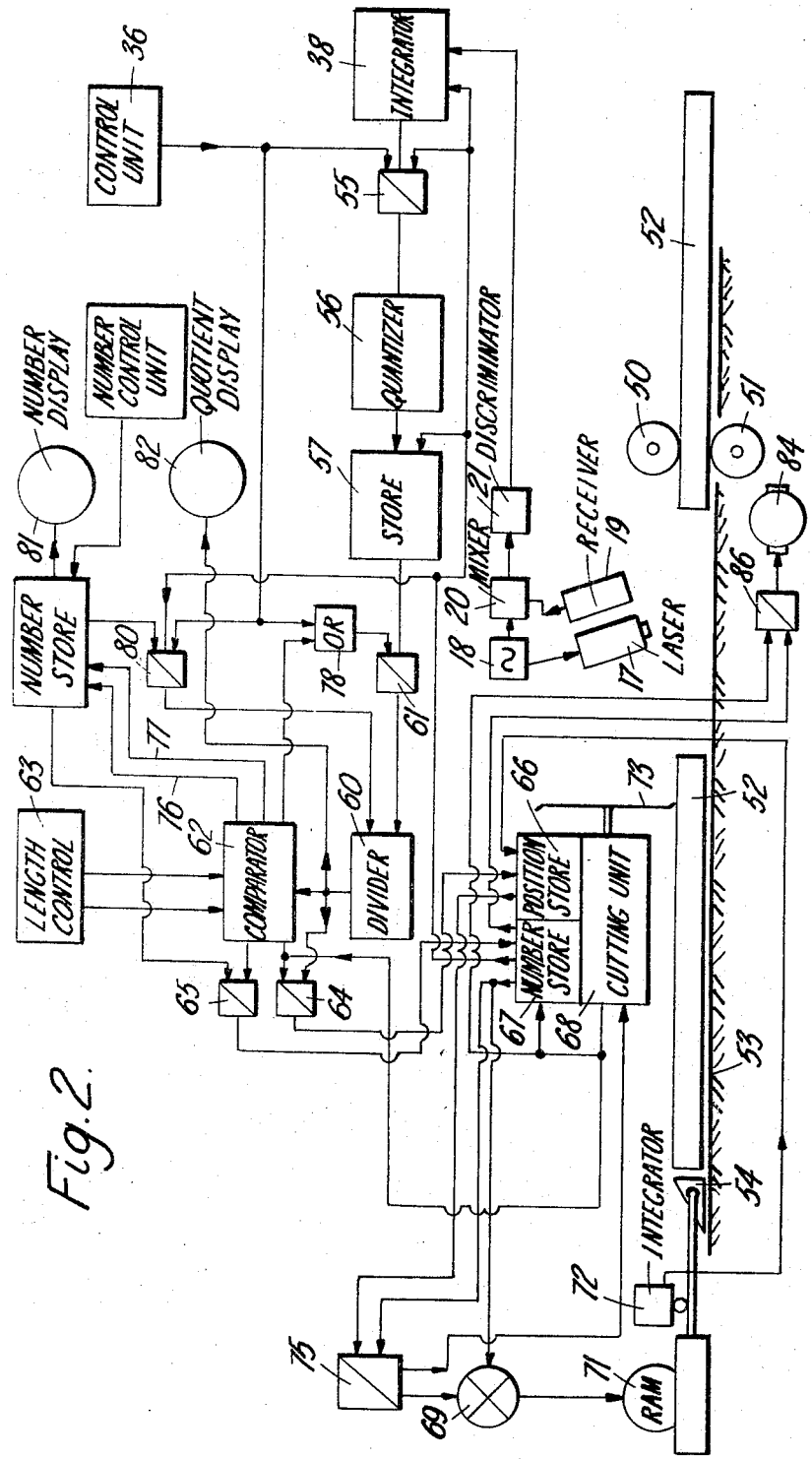

United States Patent Office 3,344,632
Patented Oct. 3, 1967

3,344,632
PROCESS CONTROL APPARATUS
Alan Phillipson, London, England, assignor to Decca Limited, London, England, a British company
Filed May 5, 1965, Ser. No. 453,349
Claims priority, application Great Britain, May 6, 1964, 18,889/64
15 Claims. (Cl. 72—10)

This invention relates to the controlling of industrial processes and more particularly to the controlling of processes where an article is produced with which physical contact cannot be made to determine the velocity or length of the article, for example because the article is too hot or too fragile.

According to this invention, in apparatus for use in an industrial process for producing an elongated article and including an adjustable control for controlling the relative movement between the article and a processing unit, there are provided a laser for directing a coherent light beam on to the article in a direction having a component along the line of movement of the article, means for receiving light reflected from the article and arranged to produce an output signal dependent on the difference in frequency between the radiated and received light and means for effecting adjustment of said adjustable control means in accordance with said output signal. The light beam may be directed in the line of motion to get the maximum frequency shift. By using a laser as a light source, the Doppler frequency shift in the reflected light due to the motion of the article can be determined by obtaining the beat frequency between the transmitted and reflected signals. A light beam from the laser will be reflected from almost any type of material and this apparatus can be used for example for sensing the velocity of articles made of metal or of plastics material. This arrangement enables control of the article or the processing unit to be effected automatically in accordance with the rate of movement of the article without any need for a sensing device to make physical contact with the article.

One application of the present invention is the control of velocity of the article from the processing unit and according to this aspect of the invention, in apparatus for use in an industrial process for producing an article which moves at a rate dependent on an adjustable control there are provided a laser for directing a coherent light beam on to the moving article in a direction having a component along the line of movement of the article, means for receiving light reflected from the article and arranged to produce an output signal dependent upon the difference of frequency of the radiated and received light and means for reflecting adjustment of said adjustable control using said output signal as a velocity feedback.

This invention is particularly applicable to the controlling of extrusion apparatus. In an extrusion process, too high a velocity of extrusion from the extrusion press may result in poor quality of the extruded material, e.g. it may cause fracture in a metal extrusion. Too low a velocity on the other hand is undesirable because it causes low productivity of the press.

According to a feature of this invention, in apparatus for producing extruded lengths of material, the aforesaid light beam is directed along the line of movement of said material and the output signal which is dependent on the difference of frequency of the radiated and received signals and hence dependent on the velocity of the extruded length, is applied to control means for controlling the extrusion process using said output signal as a velocity feedback. By this means the rate and duration of each extrusion operation can be automatically controlled without any need for any position or velocity sensing device physically contacting the extrusion during the operation. In an extrusion process such contact is not possible because the extruded material is generally both hot and fragile.

The measurement of the Doppler shift in the frequency of a light source provides an output signal dependent on the velocity of the extrusion. For practical purposes, this signal can be regarded as a measure of the instantaneous velocity and this velocity can be determined throughout the whole duration of the extrusion operation. The output signal can thus be used, employing known servo control techniques, as a velocity feedback and, for example, can be integrated to determine the instantaneous position of the end of the extruded length.

Most conveniently, the laser and the receiver for the reflected light are located remotely from the extrusion press with the output from the generator radiated in a beam directed towards the press. The radiation is preferably beamed towards the oncoming extrusion in the line of movement thereof.

Conveniently the control signal representative of the velocity of the extrusion is compared in a comparator with the output from signal generator, e.g. a potentiometer, which represents the required velocity and the difference of these two signals, constituting an error signal is amplified and fed to an electric motor which, through gearing, drives a pressure control for the extrusion press, e.g. a hydraulic control valve. Thus, when extrusion is being effected at the required rate, the error signal will be zero and the control will remain stationary. If, however, the extrusion is too fast or too slow, this will produce an error signal which is amplified and fed to the motor to effect the necessary control operation. Conveniently direct voltage error signals are employed, the polarity of the signal indicating the sense of the required adjustment. In such a control system having a motor driven valve, conveniently a velocity damping signal is added to the error signal in the amplifier, this velocity damping signal being produced, for example, by a tachometer generator driven by said motor.

Another source of error in an extrusion process is the fact that the temperatures of the billet in the furnace and the extruder may be different from the ideal temperature for maximum extrusion velocity. This may be automatically compensated by adding to the reference signal signals representing the temperatures of the extrusion press and the furnace respectively suitably scaled down in accordance with a selected function velocity change for each unit of temperature difference to produce a corresponding change in the input signal.

A further feature of this invention is the control of a flying saw or similar movable severing means used in conjunction with an extrusion press, the flying saw being automatically controlled to sever the extruded article into predetermined lengths. For this purpose there may be provided means for integrating the output signal, a comparator arranged to compare the integrated output signal with a reference signal and also arranged to signal said flying saw to start to move with said article when the difference between said integrating signal and said reference signal is less than a predetermined value. It is usual in this type of apparatus to use a flying saw which repetitively accelerates from a rest position to move at the same velocity of the extruded article and to sever thereby the article into the required lengths. If this process is controlled manually, the length may be variable and for many purposes it is required that the length be severed into lengths which closely correspond. With the above arrangement, when the difference between the extruded length and the required length is less than a predetermined value, the flying saw will start to move and will accelerate to move with the velocity of the extruded article.

Since the saw will take some time to accelerate, the difference between the predetermined limits will be representative of the time constant of the flying saw drive mechanism. In this apparatus, the output signal representative of the velocity of the extruded article may be fed to the flying saw drive to provide a reference signal, the flying saw drive means being arranged to accelerate the flying saw until the difference between the output signal and the velocity of the saw is zero. It would be important in this type of apparatus to ensure that the damping of the drive mechanism were critical rather than overdamped or underdamped so that the time taken for the flying saw to reach the velocity of the extrusion press would be definite so that the reference signal could be correspondingly controlled. It would be possible however to arrange for the adjustable reference signal controlling the velocity of extrusion to alter the damping on the flying saw drive so that critical damping may be provided for a range of extrusion velocities. The comparator may include resetting means resetting the output velocity signal integrator to a datum, so that successive integrated output distances are compared with the reference length signal whereby a plurality of lengths of article may be successively severed by the flying saw.

This apparatus finds further application in apparatus where an unknown length of elongated article is to be severed into lengths, each length lying between predetermined limits. An example of such apparatus is to be found in the final stages of a rolling mill where the rolled article is brought to rest against a stop and is then severed into required lengths. Hitherto such apparatus has had the disadvantage that the severing means used to sever the elongated article is arranged to make a series of cuts a definite distance apart. With this kind of apparatus, there may be considerable wastage if the final length of article is less than the required length. A further feature of the present invention is means whereby the elongated article may be automatically cut into lengths falling between predetermined limits without wastage. According to this aspect of the invention, where the apparatus includes means for moving the article relative to a severing device so that a length of the elongated article may be severed into a plurality of lengths each lying between predetermined limits, there are provided means for integrating said output signal during the whole passage of the article past the laser, means for dividing said integrated output signal by a divisor signal representing a possible number of lengths, said severing means being arranged to sever said article at intervals corresponding to the quotient of said integrating signal and said divisor signal. The velocity signal obtained from the laser output when integrated will give a measure of the complete length of article. The apparatus would normally include means comparing the quotient signal with signals representing said predetermined limits said comparator being arranged to inhibit said severing means if said quotient signal falls outside the limits. With this apparatus, the divisor signal may be preset so as to give a first quotient which may be suitable having regard to an estimated length of the elongated article. Since the permissible length into which the article may be cut lies between definite limits, it is possible if a number of articles are to be cut and the required limits are sufficiently far apart to be able to cut any particular length of article without any wastage. Accordingly, if the obtained quotient falls within the limits, the drive means may be arranged to move to a stop to a position such that the distance between it and the saw corresponds to said quotient signal, the article being brought to rest against the stop so that it may be severed into the number of lengths corresponding to the divisor signal, the cut length being removed and the uncut length moved up to the stop between cuts. However, the first quotient obtained may fall outside the limits and the comparator may therefore be arranged to alter said divisor signal if the quotient falls outside the limits in a sense corresponding to that which tends to make the resultant quotient fall within the limits. Very conveniently the operation is carried on by suitable analogue or digital techniques, the quotient signal and the divisor signal both being stored in suitable digital stores and the comparator being arranged to alter the divisor signal which may be stored in a bi-directional counter. As hereinbefore mentioned, the processing unit may typically be a rolling mill and the severing means may be arranged to operate after the elongate length has passed completely through the mill. It would also be possible to provide means for independently operating the flying saw or the severing means in either of the two main examples illustrated above so as for example to remove a length of obviously poor extruded material or to switch the system to manual operation as required.

In the following description reference will be made to the accompanying drawings in which:

FIGURE 1 illustrates diagrammatically one embodiment of the invention controlling the operation of an extrusion press; and FIGURE 2 illustrates diagrammatically another embodiment of the invention arranged for use with a rolling mill.

Referring firstly to FIGURE 1, there is shown an extrusion press having an extrusion head 10, a feed duct 11 and a hydraulic press 12 which is controlled by the valve 13 driven through the gear box 14 by the motor 15 such that by varying the speed of the motor the velocity of extrusion of the extruded material 16 is controlled by varying the pressure of the press 12. Arranged adjacent the extrusion head is a conventional laser 17 directing a coherent light beam on to the surface of the extruded material 16. The laser may be of any suitable conventional construction and is arranged to direct the light in a plane of movement of the extruded material so as to get the maximum resultant frequency shift. The laser is shown as having a single frequency oscillator 18, and a receiver 19 arranged to receive the back scatter of light from the extruded material, the mixer 20 receiving both the radiated and receiver frequencies and producing an output signal of the beat frequency, which beat frequency signal corresponds to the velocity of the extruded material 16. The beat frequency signal is fed to the discriminator 21, which produces a direct voltage output whose amplitude represents the extrusion velocity.

The velocity output signal from the discriminator 21 is fed to one input of the comparator 24. The other input of the comparator is fed with the output of the adding amplifier 25, one input resistor 25a of which is fed with a reference velocity signal from the speed control unit 26. The signals corresponding to temperature of the extrusion press and the furnace 27 are added to the reference signal by being fed to the input resistors 25c, 25b of the adding amplifier 25. The direct temperature signals are conveniently obtained from the thermocouples 26a and 27a embedded in the extrusion head and the furnace respectively. The output from the comparator 24 representing the required error signal is fed to the amplifier 28 whose output signal drives the electric motor 15 which through gearing drives the pressure control valve 13 for the extrusion press. Thus, when extrusion is being effected at the required rate, the error signal will be zero and the motor 15 and control valve 13 will remain stationary. If however the extrusion is too fast or too slow an error signal is produced which is amplified and fed to the motor 15 to effect the necessary correction. The reference signal generator is shown as a simple potentiometer providing a direct signal corresponding to the required speed. In the system shown in FIGURE 1, the motor driven valve is velocity damped by the tachometer generator 29 producing a velocity damping signal which is added to the error signal at the input of the amplifier 28.

The apparatus shown in FIGURE 1 also includes means for severing the extruded length of material into predetermined lengths. For this purpose, the flying saw 31 is provided having a carriage 32 arranged to run along the track 30 and a saw 33 arranged to be moved laterally energised by the control unit 34. The position of the carriage on the track 30 is determined by the hydraulic ram 35, the pressure provided by the ram controlled by the motor 36, the output of the motor being fed through suitable gearing 37 to control the position of the valve 35a, in a manner similar to that of the motor 15 controlling the valve 13.

The velocity output signal from the discriminator 21 is fed into the integrator 38 which starts the integration from a datum and the integrated output signal is compared in the comparator 39 with a reference length signal from the length control unit 40. The comparator which may be a simple direct voltage comparator is arranged to produce a signal on lead 41 starting the motor 36 when the difference between the integrated output signal and the reference signal is less than the predetermined value. When this happens, the motor is started and accelerates the flying saw to move in correspondence with the velocity of the extruded length. For this purpose the output signal from the discriminator 21 is fed to the comparator 42 producing an error signal representing the difference between the velocity output signal with a signal representing the speed of the saw from the tachometer generator 43 (driven by, for example, roller 143 resting on link between ram 35 and carriage 32) so that the motor is driven by the error signal to control the valve 35a to produce the required speed of traverse of the carriage 32. When the required speed is reached, the comparator 42 signals control unit 34 that the error voltage is zero, the unit 34 moving the saw transverse the apparatus to sever the extruded material 16. After this operation, the control unit is arranged to signal the integrating unit to reset to zero again, and to cut off the valve 35 and to operate the valve 44 to operate the return ram 45 to return the carriage to the starting position that the process is repetitively carried on the extended material being removed by any suitable means. It will be apparent with this apparatus that it is necessary to adjust the compared voltages in the comparator 39 so that the time delay involved in the saw getting up to the right speed is allowed for when starting the motor 36. For this purpose a time lag voltage may be added to the integrated output voltage so that the comparator may signal the motor 36 when the two voltages fed into its inputs exactly correspond. The compensating voltage may be controlled by the speed control unit 26, in accordance with the time delay at various speeds, the voltage from the potentiometer being added in suitable proportions in the adding amplifier 46 to the integrated output voltage from the integrator 38. The manual control unit 48 is arranged to operate the motor 36 to override the operation of the automatic control units. This may be useful if for example an obviously poor length of extruded material appears.

In FIGURE 2 is shown a further embodiment of the invention applied to a rolling mill which is illustrated diagrammatically by the rollers 50 and 51 rolling out a length of material 52 in the direction shown, the material being transferred thereby on to the runway 53 against the stop 54 after the rolling operation. As in FIGURE 1, the laser and Doppler units 17, 18, 19, 20, 21 are arranged to feed the velocity signal to the integrator 38. With the apparatus described in FIGURE 2, the integration is performed for the whole length of traverse of the elongated article through the rollers 50 and 51. The integrator 38 is then arranged to feed the integrated signal via the gate 55, when instructed to do so by the control 56, into the digital store 57 the integrated output from the integrator 38 being quantized into digital signal by the quantizer 56. The number store 59 is at the same time arranged to feed its output via the gate 80 to one input of the divider 60, the output of the digital store 57 being also fed to the other input of the divider 60 via the gate 61, the control unit 56 sending a gate opening signal to the gates 55, 80 and OR circuit 61. The divider 60 performs digital division, the quotient signal being fed to the comparison circuit 62 which compares the digital signal thus obtained with signals from the length control unit 63. These signals represent the extreme limits within which a cut length of material must be. If the quotient signal falls within the values of the limit signals, the comparator 62 opens gates 64 and 65 to feed the quotient signal and the number signal to the position control unit 66 and the number store 67 (in the cutting unit 68) respectively. If signals are present in the position store 66 and the number store 67, the gate 75 is opened to feed an energising signal to the valve 69 operating the hydraulic ram 70 to move the stop 54 and the material 52 back along the runway 53 until the distance between the stop 54 and the saw 73 is equal to the quotient signal. For this purpose, the position of the stop is obtained by the integrator 72 integrating the distance moved by the periphery of the roller 85 and providing a digital signal, conveniently in Gray code, representing the distance of the stop 54 from the saw 73 since the saw is fixed, this may easily be achieved by providing a suitable datum signal store and a subtractor in the integrator 72. The position signal from the integrator 72 is compared by a simple digital comparator in the store 66, the comparator clearing the store 66 when the positional signal from the integrator 72 and the stored signal in store 66 are the same. The gate 75 then closes, the stop 54 ceases to move, and tthe gate 75 provides a single control signal to the cutting unit 68 to operate the saw 73 by moving transverse the carriage, to sever the material 52. When the cut is completed the saw withdraws and the cutting unit provides an output pulse signal to gate 86, and also to store 67 to reduce the stored number total by one, the store 67 being conveniently a bi-directional counter. As long as there is a number in the store, a signal will be fed to the other input of gate 86 so that when the cutting operation ceases, the gate 86 will provide a signal to motor 84 which drives the remaining material 52 up to the stop, the severed length having been removed by any suitable method. After a predetermined time allowing the rollers to move the material to move up to the stop, the cutting unit again operates, unless inhibited from doing so by the absence of a number in store 67 a suitable gate (not shown) being provided for this purpose. It will be apparent that the store 67 would usually be arranged to store $(n-1)$ if $n$ pieces are required. The cutting operation is thereby continued, until the number in the number store is reduced to zero, at which time the number unit provides resetting signals for the integrator 38, the store 57, the gates 55 and 80 and a signal to the valve 69 for the ram 70 to return the ram to its initial starting position. The apparatus is then ready for operating on a further length of material. If the quotient signal falls outside the limits set by the unit 63, the gates 64 and 65 remain unopened, the unit 62 sending a pulse on either of leads 76 or 77 to add to or subtract from the total stored in the store 59 (which is conveniently a bi-directional counter), according to whether the quotient signal is above or below the required range, and to reopen the gate 61 via the OR circuit 78 to restart the calculation which is repeatedly performed until the correct number of lengths is found.

The number and quotient signals are fed to display units 81 and 82 to display the number and length of pieces to be cut, the number being initially set into store 59 by the manual control 81.

For some purposes, it may be desirable to use the stop 54 to move the material 52, and it would be possible to arrange for the cutting unit to feed a signal to reopen gate 64 to feed a number into the store 66 so that gate 75 would be reopened and the ram operated. In this arrangement the integrator would have to provide signals at regular intervals representing units of distance moved, and the store 66 would be a bi-directional counter, gate 75 being closed when the total in store 66 were reduced to zero.

In the apparatus of FIGURE 1, it may be desirable to automatically change the length of the article or the speed of extrusion. For this purpose, it would be possible to derive the voltage control signals for units 26 and 40 from a magnetic tape unit so that the apparatus may be automatically controlled for long periods.

The apparatus hereinbefore described with reference to FIGURE 1 might also be used to control the speed of a winding machine, the laser being directed for example on to the wire to be wound and the velocity error signal being used as a velocity feedback to control the winding speed.

I claim:

1. Apparatus for use in an industrial process for producing an elongated article and including an adjustable control for controlling the relative movement between the article and a processing unit, wherein there are provided a laser for directing a coherent light beam on to the article in a direction having a component along the line of movement of the article, means for receiving light reflected from the article and arranged to produce an output signal dependent on the difference in frequency between the radiated and received light and means for effecting adjustment of said adjustable control means in accordance with said output signal.

2. Apparatus for use in an industrial process for producing an elongated article which moves at a rate dependent on an adjustable control, wherein there are provided a laser for directing a coherent light beam on to the moving article in a direction having a component along the line of movement of the article, means for receiving light reflected from the article and arranged to produce an output signal dependent on the difference in frequency of the radiated and received light and means for effecting adjustment of said adjustable control using said output signal as a velocity feedback.

3. Apparatus as claimed in claim 2 and having an extrusion press arranged to produce extruded lengths of material, wherein said light beam is directed along the line of movement of said material and said output signal is applied as a velocity feedback to control means controlling the rate of extrusion.

4. Apparatus as claimed in claim 3 wherein said control signal is compared in a comparator with a reference signal from a signal generator repesenting the required velocity of extrusion, the difference signal being amplified and fed to means for controlling a pressure control for said extrusion press.

5. Apparatus as claimed in claim 4 wherein the extrusion press includes a motor driven valve for adjusting the rate of extrusion and wherein a velocity damping signal is added to the error signal in the amplifier said velocity damping signal being obtained from a tachometer generator driven by said motor.

6. Apparatus as claimed in claim 4 wherein there are provided means for determining the temperature of the article fed to said extrusion press and the temperature of said extrusion press, and means for adding a signal representing the two temperatures to said reference signal.

7. Apparatus for use with an extrusion press extruding an elongated article; a laser for directing a coherent light beam on to the moving article in a direction having a component along the line of movement of the article, a receiver receiving light reflected back from the article, mixing means producing an output signal dependent on the difference in frequency between the radiated and received light, an adjustable drive for forcing the article through the extrusion press, a generator generating a reference signal, a comparator producing an error signal repressing the difference between said output signal and said reference signal and means for altering said adjustable drive in accordance with said error signal.

8. Apparatus as claimed in claim 7 wherein said generator is an adjustable potentiometer.

9. Apparatus as claimed in claim 7 and including a flying saw arranged to sever the moving article into predetermined lengths, wherein there are provided means for integrating said output signal, a comparator arranged to compare the integrated signal with a reference signal and also arranged to signal said flying saw to move with said article when the difference between said integrated signal and said reference signal is less than a predetermined value.

10. Apparatus as claimed in claim 9 wherein the drive for said flying saw includes means for comparing said output signal with a signal representative of the speed of traverse of the saw along the moving article and for controlling the speed of traverse of the saw in accordance with the difference between these two signals.

11. Apparatus as claimed in claim 9 wherein said comparator includes resetting means whereby successive integrated output distances are compared with the reference signal, whereby a plurality of lengths of article may be successively severed.

12. Apparatus for use in an industrial process for producing an elongated article, comprising a laser for directing a coherent light beam on to the article in a direction moving a component along the line of movement of the article, a receiver receiving light reflected from the article and producing an output signal dependent on the difference in frequency between the radiated and received light, severing means operative to sever said article, a motor roller driven by said motor to drive said article past said severing means and said laser, an integrator integrating said output signal during the whole passage of said article past said laser, means for dividing said integrated output signal by a divisor signal representing a possible number of severed lengths, and stop means arranged to limit the movement of said article with respect to said severing means, and means for moving said stop means to a position wherein said stop is separated from said severing means by a distance corresponding to the quotient of said integrated output signal and said divisor signal.

13. Apparatus as claimed in claim 12 wherein there are provided means for comparing said quotient signal with signals representing predetermined limits, said comparator being arranged to inhibit said severing means if said quotient signal be outside said limits.

14. Apparatus as claimed in claim 13 wherein said comparator is arranged to alter said divisor signal, if said quotient signal falls outside said limits, in a sense corresponding to that which tends to make the resultant quotient fall within said limits.

15. Apparatus as claimed in claim 12 wherein there are provided means for storing the number signal, the severing means being arranged to make the number of cuts corresponding to the number of required lengths, the material being moved up to said stop means by said rollers between cuts so that the cut lengths are equal to the length determined by said quotient signal.

References Cited

UNITED STATES PATENTS

| | | | |
|---|---|---|---|
| 2,972,268 | 2/1961 | Wallace et al. | 72—8 |
| 3,096,670 | 7/1963 | Stringer | 72—16 |
| 3,150,363 | 9/1964 | Finvold | 331—94.5 |

OTHER REFERENCES

"Optical Masers in Space Navigation," by C. B. Ellis and I. A. Greenwood, Navigation (VKIN 3), volume 8, Number 3, pp. 206–213, Autumn 1961.

CHARLES W. LANHAM, *Primary Examiner.*

H. D. HOINKES, *Assistant Examiner.*